US008364294B1

(12) United States Patent
Moulios et al.

(10) Patent No.: US 8,364,294 B1
(45) Date of Patent: Jan. 29, 2013

(54) TWO-PHASE EDITING OF SIGNAL DATA

(75) Inventors: Christopher J. Moulios, Cupertino, CA (US); Nikhil M. Bhatt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1619 days.

(21) Appl. No.: 11/195,265

(22) Filed: Aug. 1, 2005

(51) Int. Cl.
*G06F 17/00* (2006.01)
*G06F 3/00* (2006.01)
*G10L 21/00* (2006.01)
*H04B 1/20* (2006.01)

(52) U.S. Cl. ............... 700/94; 704/278; 715/716; 369/4
(58) Field of Classification Search .................... 700/94; 704/278; 369/4; 715/716
See application file for complete search history.

(56) References Cited

U.S. PATENT DOCUMENTS

| | | | |
|---|---|---|---|
| 3,696,401 A | 10/1972 | Vance | |
| 3,932,888 A | 1/1976 | Lemke et al. | |
| 4,941,035 A | 7/1990 | Judge | |
| 5,113,252 A | 5/1992 | Horie et al. | |
| 5,450,132 A | 9/1995 | Harris et al. | |
| 5,537,530 A | 7/1996 | Edgar et al. | |
| 5,649,050 A | 7/1997 | Hardwick et al. | |
| 5,752,224 A | 5/1998 | Tsutsui et al. | |
| 5,758,020 A | 5/1998 | Tsutsui | |
| 6,088,455 A | 7/2000 | Logan et al. | |
| 6,148,175 A | 11/2000 | Freedland | |
| 6,232,540 B1 | 5/2001 | Kondo | |
| 6,266,643 B1 | 7/2001 | Canfield et al. | |
| 6,298,482 B1 | 10/2001 | Seidman et al. | |
| 6,337,947 B1 | 1/2002 | Porter et al. | |
| 7,055,166 B1 | 5/2006 | Logan et al. | |
| 7,424,677 B2 | 9/2008 | Sezan et al. | |
| 7,454,010 B1 | 11/2008 | Ebenezer | |
| 7,702,014 B1 | 4/2010 | Kellock et al. | |
| 2002/0028060 A1 | 3/2002 | Murata et al. | |
| 2002/0188602 A1 | 12/2002 | Stubler et al. | |
| 2003/0014135 A1* | 1/2003 | Moulios | 700/94 |
| 2003/0067554 A1 | 4/2003 | Klarfeld et al. | |
| 2003/0084065 A1 | 5/2003 | Lin et al. | |
| 2003/0093790 A1 | 5/2003 | Logan et al. | |
| 2004/0189827 A1 | 9/2004 | Kim et al. | |
| 2004/0199277 A1* | 10/2004 | Bianchi et al. | 700/94 |
| 2010/0303257 A1 | 12/2010 | Moulios et al. | |

OTHER PUBLICATIONS

Higgins, Derek, "Wave Corrector v3.0 Vinyl/Tape to CD-R Processing Digital Audio Editing for the PC User Manual", Jul. 22, 2004, Ganymede Test & Measurement, v3.0, from "http://web.archive.org/web/20040722132002/www.wavecor.co.uk/help300.pdf".*
Sonic Foundry, Inc., "Sound Forge 6.0", copyright 2002-2003, Sonic Foundry, Inc., pp. 1-14 and 129-142, http://www.sonycreativesoftware.com/download/manuals/soundforgefamily.*

* cited by examiner

*Primary Examiner* — Davetta W Goins
*Assistant Examiner* — Daniel Sellers
(74) *Attorney, Agent, or Firm* — Blakely, Sokoloff, Taylor & Zafman LLP

(57) ABSTRACT

Tools and techniques are provided to allow the user of a signal editing application to retain control over individual changes, while still relieving the user of the responsibility of manually identifying problems. Specifically, tools and techniques are provided which separate the automated finding of potential problems from the automated correction of those problems. Thus, editing is performed in two phases, referred to herein as the "analysis" phase and the "action" phase. During the analysis phase, the signal editing application automatically identifies target areas within the signal that may be of particular interest to the user. During the "action" phase, the user is presented with the results of the analysis phase, and is able to decide what action to take relative to each target area.

47 Claims, 9 Drawing Sheets

| Analysis Type | Parameter |
|---|---|
| ▼ ☑ Clicks and Pops | |
| Threshold | ◯━━━━━━━ 0 |
| ☑ Power Line Hum | |
| ☑ DC Offset | |
| ☑ Phase | |
| ☑ Clipped Signal | |
| ▼ ☑ Silence | |
| Threshold | ◯━━━━━━━ 0 |
| | |

| Status | Problem | Start | Length | Ch |
|---|---|---|---|---|
| Not Fixed | Click/Pop | 2.78 | 0.17 | LR |
| Not Fixed | Click/Pop | 4.47 | 0.08 | LR |
| Not Fixed | Click/Pop | 5.35 | 0.02 | LR |
| Not Fixed | Click/Pop | 9.10 | 0.12 | LR |
| Not Fixed | Click/Pop | 9.81 | 0.21 | LR |
| Not Fixed | Click/Pop | 11.85 | 0.15 | LR |
| Not Fixed | Click/Pop | 13.24 | 0.02 | L |
| Not Fixed | Click/Pop | 13.57 | 0.02 | L |
| Not Fixed | Click/Pop | 13.86 | 0.10 | LR |
| Not Fixed | Click/Pop | 16.33 | 0.02 | LR |
| Not Fixed | Click/Pop | 17.50 | 0.02 | LR |
| Not Fixed | Click/Pop | 20.89 | 0.06 | LR |
| Not Fixed | Click/Pop | 22.56 | 0.06 | LR |
| - | Silence | 41.38 | 0.00 | LR |
| - | Silence | 41.39 | 0.00 | LR |
| - | Silence | 41.39 | 0.00 | LR |
| - | Silence | 41.40 | 0.00 | LR |
| - | Silence | 41.41 | 0.00 | LR |
| - | Silence | 41.41 | 0.00 | LR |
| - | Silence | 41.42 | 0.00 | LR |
| - | Silence | 41.42 | 0.00 | LR |
| - | Silence | | | LR |

Clear Fixed    🔍    Fix All    Fix 302       304       306       308

FIG. 3

| Status | Problem | Start | Length | Ch |
|---|---|---|---|---|
| Not Fixed | Click/Pop | 2.78 | 0.17 | LR |
FIG. 5
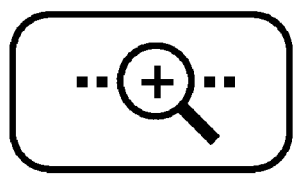
FIG. 8
FIG. 10

TWO-PHASE EDITING OF SIGNAL DATA

FIELD OF THE INVENTION

The present invention relates to digital editing and, more specifically, to editing signal data.

BACKGROUND

It is desirable, in a variety of contexts, to capture signals. The nature of the signals may vary from context to context. For example, in a medical context, it may be desirable to capture signals that represent heart activity. In the context of sound studios, it may be desirable to capture audio signals produced by music artists. The techniques described herein are not limited to any particular type of recorded signal. The digital representation of a signal is referred to herein as "signal data".

For a variety of reasons, it may be desirable to edit the signal data after a signal has been digitally recorded. For example, an audio recording of a lecture may include a cough that should be removed. In addition to problems created by the recording environment (such as a coughing audience), the recording process itself may introduce problems, such as hissing or popping noises, that should be removed from the recording.

Many signal editing applications are available for performing post-recording edits to a captured signal. In the context of audio signals, many audio editing applications allow a user to listen to the audio. While the audio is being played, the user is presented with a visual representation of the signal, with an indication of the location, within the signal, that is currently being played. While listening to the audio and watching the visual representation of the signal, the user may identify a problem that requires fixing. For example, the user may hear a "cough", and see a spike that represents the cough in the visual representation of the signal. The user may then use a tool provided by the editing application to correct the problem. For example, the user may replace the portion of the signal that contains the cough with an ambient noise print, as described in U.S. patent application Ser. No. 11/104,995, filed on Apr. 12, 2005, the contents of which are incorporated herein by this reference.

Some sophisticated signal editing applications may even provide error correction tools that do not require the user to identify the location of the problem. For example, a sound editing application may simply have a "remove pops" option. When selected, the "remove pops" tool attempts to find and remove all "pops" in the recorded signal. While such tools relieve the user of the responsibility of finding the "pops", they do so by reducing the user's control over the editing process. For example, the "remove pops" tool may remove some sounds that the user wants to keep in the signal, and may leave in some sounds that should be removed. No matter how accurate the tool is, it cannot be guaranteed to perform all of the edits the user desires, and only those edits that the user desires.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram of an interface that includes controls for specifying which analysis processes to execute during the analysis phase, according to an embodiment of the invention;

FIG. 3 is a block diagram of a Result List interface, according to an embodiment of the invention;

FIG. 5 is a block diagram that illustrates a Result List element, according to an embodiment of the invention;

FIG. 8 is a block diagram that illustrates a Magnify Button, according to an embodiment of the invention;

FIG. 10 is a block diagram of a Fix All button, according to an embodiment of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Tools and techniques are provided to allow the user of a signal editing application to retain control over individual changes, while still relieving the user of the responsibility of manually identifying problems. Specifically, tools and techniques are provided which separate the automated finding of potential problems from the automated correction of those problems. Thus, editing is performed in two phases, referred to herein as the "analysis" phase and the "action" phase.

During the analysis phase, the signal editing application automatically identifies portions of the signal that may be of particular interest to the user. The portions thus identified are referred to herein as "target areas". The target areas may correspond to potential problems (such as a "pop" in an audio signal), or that have characteristics that the user may be interested in (such as periods of "silence"). During the analysis phase, the signal editing application generates and stores information about the target areas, but does not actually edit the signal.

During the "action" phase, the user is presented with the results of the analysis phase, and is able to decide what action to take relative to each target area. As shall be described in greater detail hereafter, various tools are provided to assist the user in deciding which action to take relative to any given target area, and in automatically performing the desired action.

Overview of Two-Phase Editing

Figure 1:
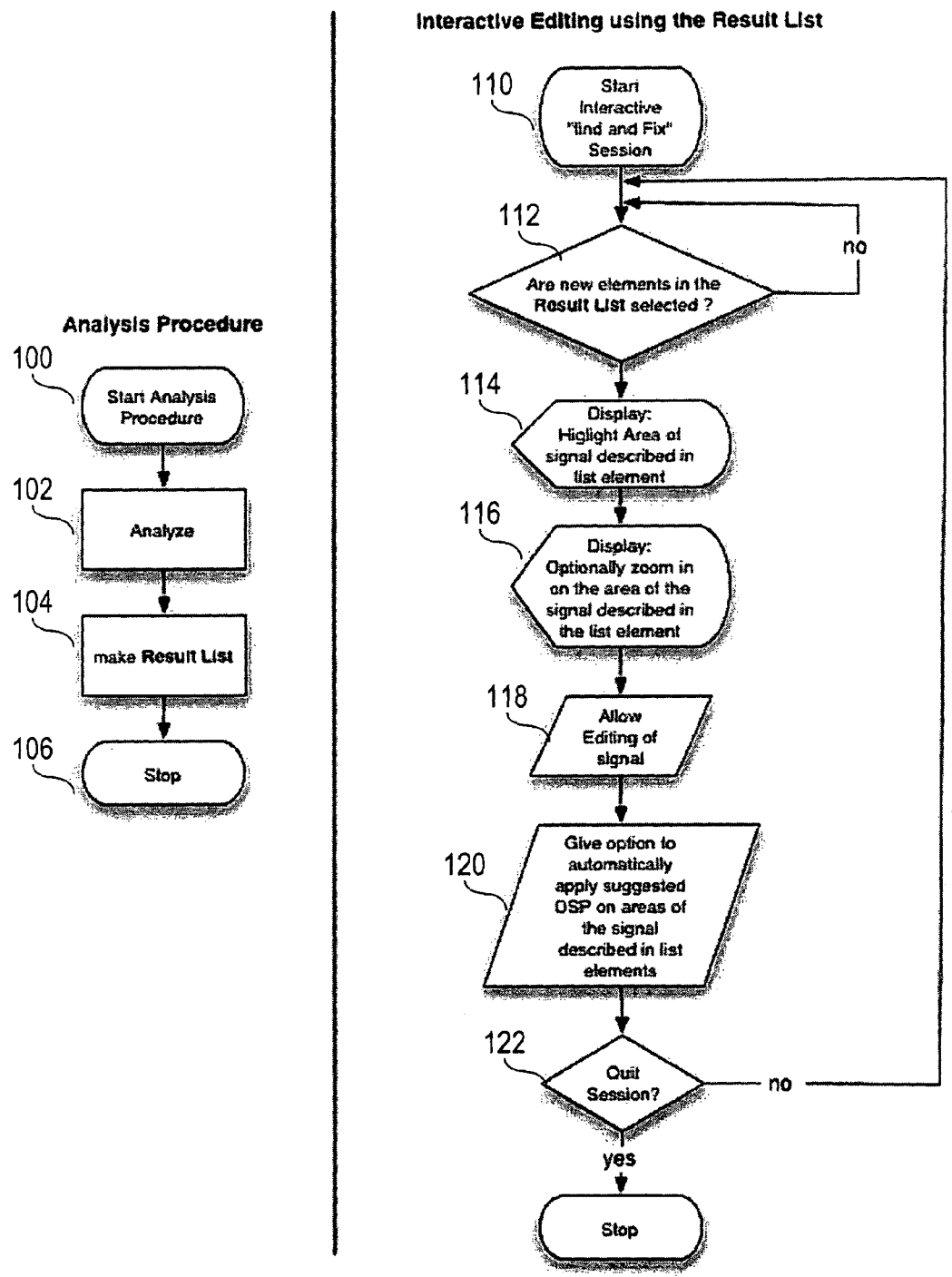
FIG. 1 is a flowchart illustrating steps performed during the analysis phase and the action phase of a two-phase editing process, according to an embodiment of the invention.

Referring to FIG. 1, it is a flowchart that illustrates the general steps involved in each of the phases of an analysis/action editing operation, according to an embodiment of the invention. The analysis phase is initiated (step 100) in response to user input received through the interface of the signal editing tool. The signal editing application then automatically analyzes the signal data to identify target areas (step 102). During step 102, several different analysis processes may be run against the signal data, where each analysis process selects target areas based on different selection criteria.

Based on the information from the analysis, the signal editing tool then builds a result list (step 104). According to one embodiment, the result list includes entries for each target area identified during the analysis, where the entry for a given target area indicates information about the target area, including an indication of the specific analysis process that selected the target area. At the end of the analysis phase (step 106), the result list has been created, but no changes have been made to the signal itself.

At step 110, the action phase begins when the user initiates a "find and fix" session. During the find and fix session, the signal editing tool waits for the user to select one or more elements in the result list (step 112). When the user has selected one or more elements, the visual display of the signal is modified (step 114) to highlight the target areas that correspond to the selected elements. For example, the portion of the visual depiction of the signal that corresponds to a selected target area may be shown in a different color than the color used for the rest of the visual depiction of the signal.

At step 116, the user may select a tool to zoom in on the portion of the visual depiction of the signal that corresponds to a selected element. At step 118, the user may edit the signal as the user deems appropriate. According to one embodiment, the editing of the signal is facilitated by allowing the user to select a control to activate an automated editing operation (step 120). The control that the signal editing application presents to the user may be based on the nature of the selected element. For example, if the selected element corresponds to a target area that, during the analysis, was identified as a "click", then the control presented to the user would be a control for activating an automated click removal operation.

According to one embodiment, any automated editing operation that is activated at step 120 is applied only to the target areas that correspond to the currently selected elements in the result list. Thus, even though the result list may include dozens of elements that correspond to "clicks" within the digital signal, activation of the click removal operation in step 120 will cause the automated removal of only those clicks that correspond to currently selected elements in the result list.

At step 122, the user may quit the interactive session. If the user does not quit, then control returns to step 112, where the user may select a new set of elements from the result list.

The Analysis Phase

As mentioned above, before any interactive work begins, an analysis procedure is performed. The analysis procedure creates the Result List. The user then interacts with the Result List to investigate potential areas of interest in the signal and make decisions about how to react.

More than one type of analysis can be run during the analysis phase. For example, a signal editing application designed for audio signals may perform click and pop detection, hum detection, DC offset detection, phase problem detection, clipped signal detection and silence detection. Each of these analysis processes applies its own distinct selection criteria. As a result, there may or may not be overlap between the target areas identified during the analysis phase. These are merely examples of the types of analysis that may be performed in the context of audio signal editing. The techniques described herein are not limited to any particular type of analysis. Further, the types of analysis will vary from context to context. Thus, the characteristics of signal portions that may be of interest to a user editing the recording of an electrocardiogram may be completely different than the characteristics of signal portions that are of interest to a user editing a music recording.

According to one embodiment, the signal editing application provides the user with controls for selecting which types of analysis are to be performed during the analysis phase. FIG. 2 is a block diagram that illustrates controls that may be presented to the user of an audio signal editing application, for example. As illustrated in FIG. 2, some types of analyses may have user-adjustable parameters. Preferably, the user is provided controls for specifying such parameters. In the illustrated example, the interface includes a slide control that allows the user to specify a "Threshold" parameter for both the "clicks and pops" analysis and the "silence" analysis.

Typically, the analysis processes provided by a tool will be designed to detect potential problems in the signal. However, the analysis tools need not be limited to the detection of potential problems. Rather, analysis processes may be provided for any type of area of potential interest, such as non-negative events like "silence" in an audio signal.

The Result List

As mentioned above, the target areas discovered by analysis during the analysis phase are added to a "Result list". A user interface that contains the results list information is presented to the user. During the action phase, the results list interface is a tool through which the user may perform a variety of actions, as shall be described in greater detail hereafter.

FIG. 3 is a block diagram of a results list interface 300, as may be provided in an audio signal editing application. Results list interface 300 includes several list elements. Each list element corresponds to a target area of the signal, and contains information about the corresponding target area. The information that is contained in the list element for a target area may vary from implementation to implementation. The techniques described herein are not limited to any particular type of information. Such information may include, for example, an indication about which analysis process detected the target area, the length of the target area, and the location of the target area within the signal.

In the illustrated results list interface 300, the results list entry for each target area includes a status field, a problem field, a start field, a length field and a channels field. These fields are also shown in FIG. 5. The status field shows whether the problem is fixed or not fixed. At the start of the action phase, none of the problems that are detected during the analysis will have been fixed, so the status field for all entries will initially indicate that they are not fixed.

The problem field describes what the corresponding target area represents. For example, if the corresponding target area was detected by the "silence" analysis process, then the problem field may indicate that the corresponding target area is "silence".

The Start field shows the point, within the signal data, at which the target area begins. The Length field shows the duration of the corresponding target area. The Channels field shows whether the problem occurs in a specific signal channel. For audio, this is often the left channel (L), the right channel (R), or both channels (LR) of a stereo audio file.

The illustrated results list interface 300 also includes several button controls 302, 304, 306 and 308. As shall be described in greater detail hereafter, these controls may be selected to invoke operations that assist the user during the interactive editing of the signal during the action phase.

Visually Highlighting Target Areas

According to one embodiment, when the list is created, target areas that correspond to each list element are also highlighted in the visual depiction of the signal. The manner in which the target areas are highlighted may vary from implementation to implementation. For example, the portion of the signal that corresponds to target areas may be displayed in a different color than the color used to depict the rest of the signal.

Figure 4:
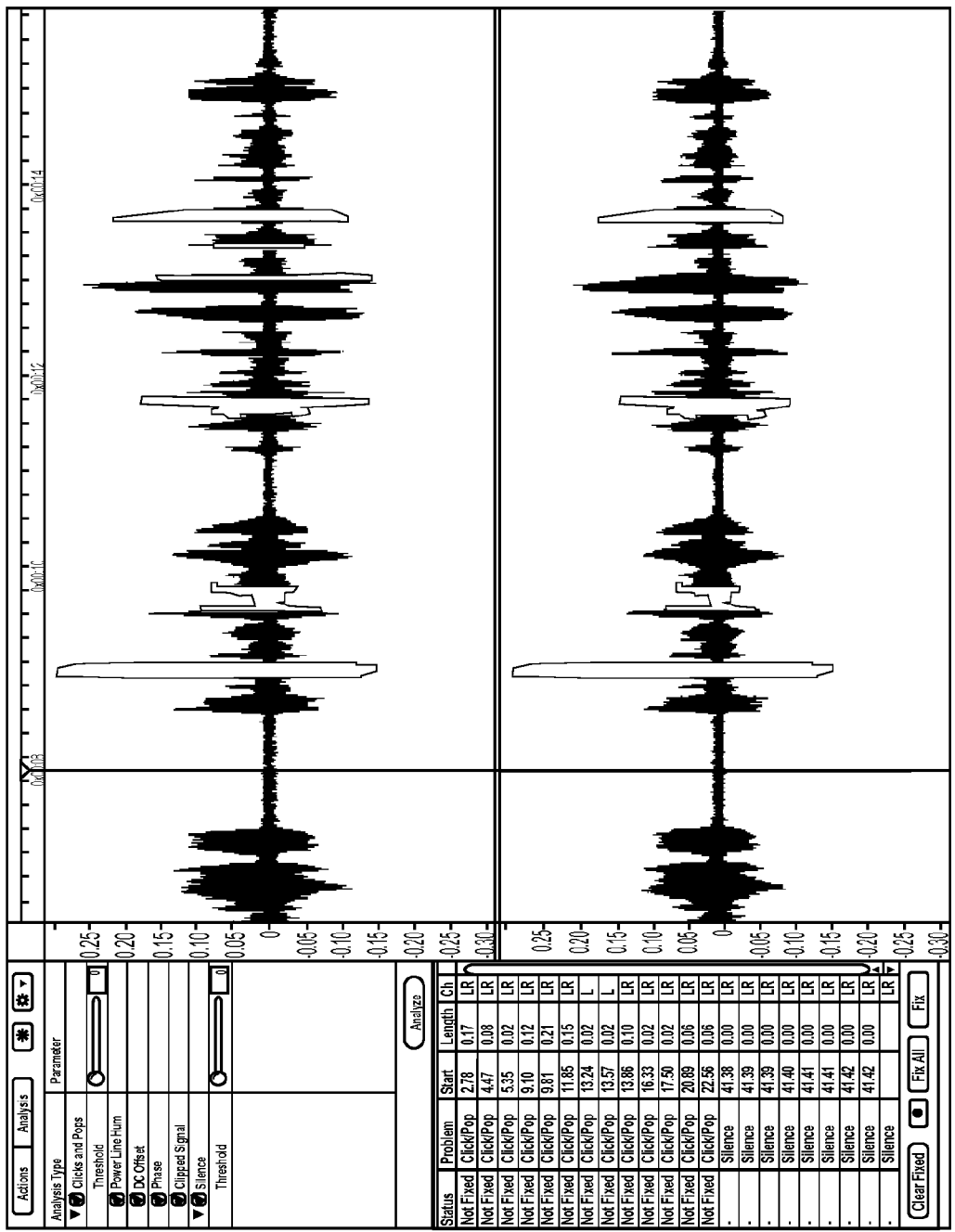
FIG. 4 is a block diagram that illustrates how the portions of the signal that correspond to target areas may be highlighted in the depiction of the signal, according to an embodiment of the invention.

FIG. 4 is an example of a signal display that includes a Result List interface and a visual depiction of a signal. In the visual depiction of the signal, the portions of the signal that correspond to the items in the Result List are depicted differently to visually distinguish the target areas from the rest of the depicted signal.

In addition to visually highlighting all target areas, the signal editing application may be designed to provide visual highlighting of user selected target areas. Specifically, in one embodiment, when a user selects an item in the Result List interface, the part of the depicted signal that corresponds to the selected item becomes highlighted (e.g. red) in the waveform display, making it easy to see where in the signal depiction the problem occurs. If multiple items are selected from the Result List interface, then the parts of the depicted signal to which any of the selected problems apply become highlighted (e.g. red).

Figure 6:
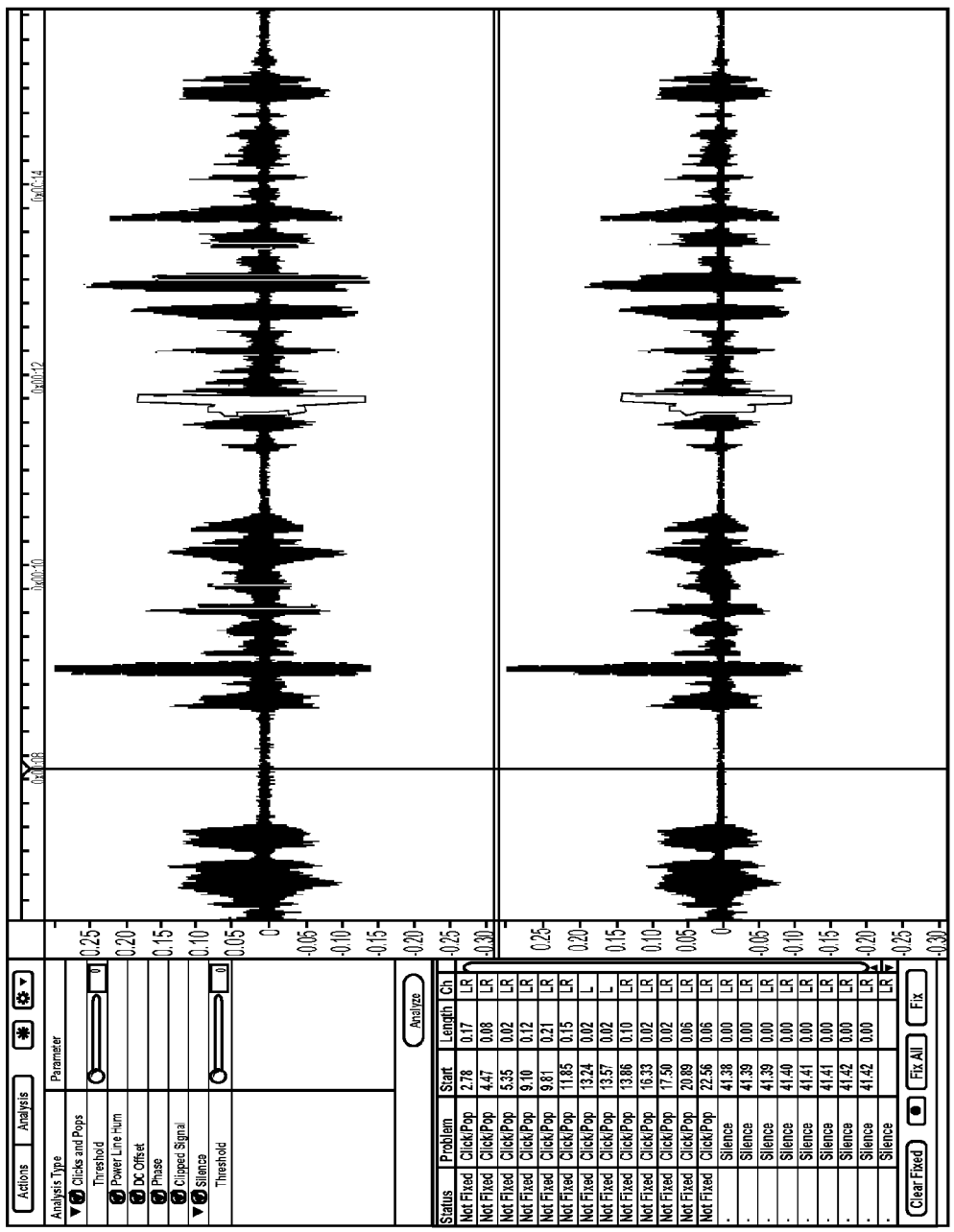
FIG. 6 is a block diagram that illustrates how the portion of the signal that corresponds to a target area associated with a selected element may be highlighted in the depiction of the signal, according to an embodiment of the invention.
Figure 7:
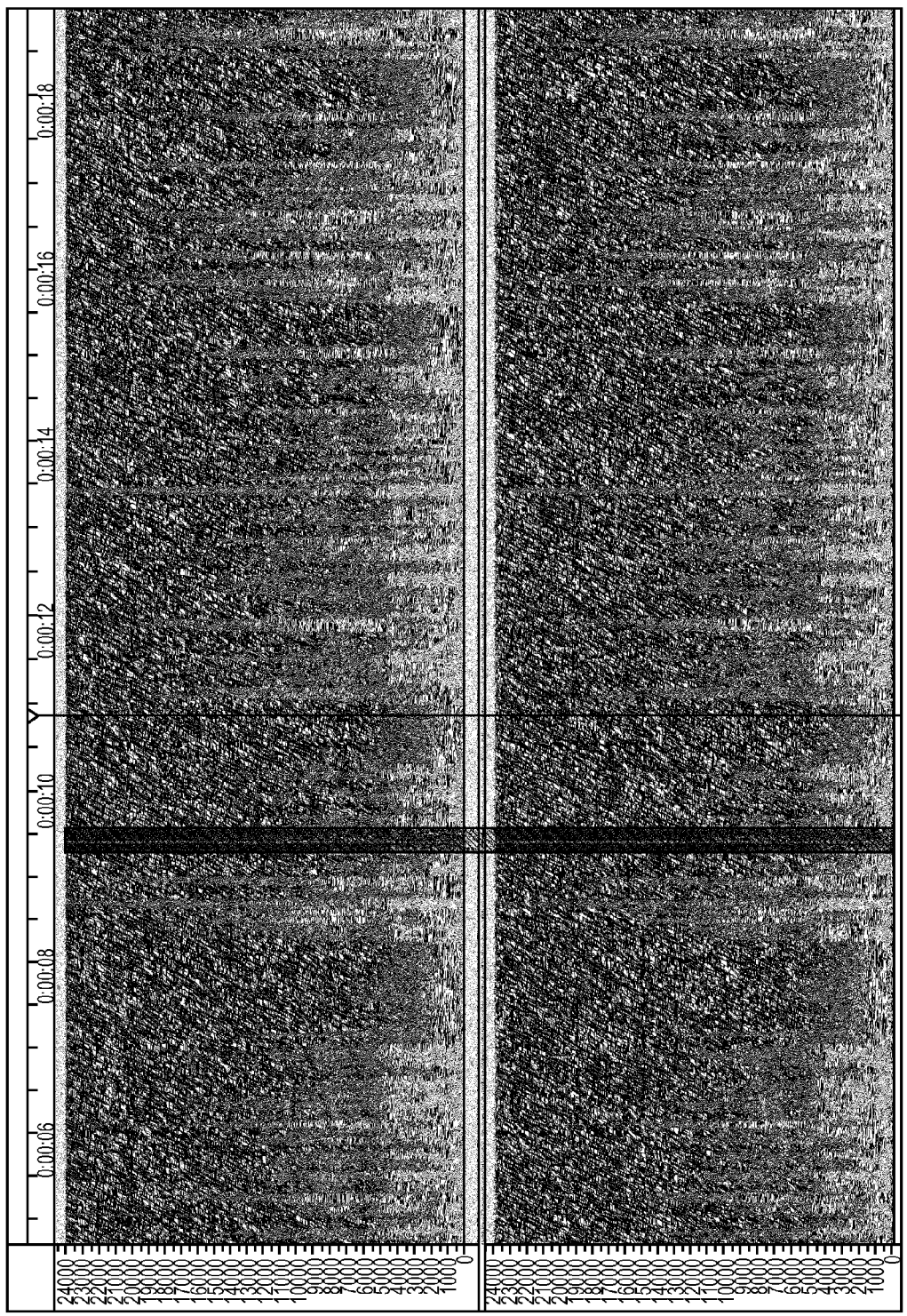
FIG. 7 is a block diagram that illustrates another way that the portion of the signal that corresponds to a target area associated with a selected element may be highlighted in the depiction of the signal, according to an embodiment of the invention.
Figure 9:
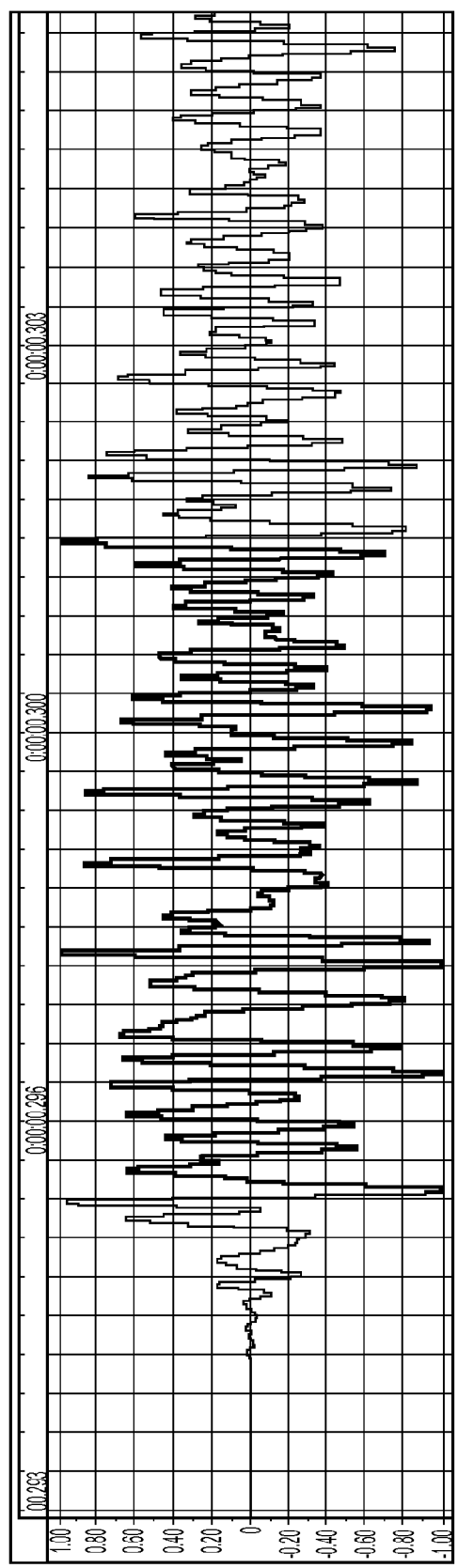
FIG. 9 is a block diagram that illustrates a "zoomed-in" depiction of the portion of the signal that corresponds to the target area associated with a selected element, according to an embodiment of the invention.

FIGS. 6 and 7 illustrate the visual depiction of a signal in which the portion of the signal that corresponds to a selected item in the Result List interface is highlighted. In FIG. 6, the portion of the signal that corresponds to a selected item is drawn in a different color than the rest of the signal. In FIG. 7, both the foreground and background colors of the depiction of the signal have been changed to highlight the portion of the signal that corresponds to the selected result list item.

User Interaction with Selected Target Area

One the Result List has been generated and the Result List interface has been displayed, the user may begin the action phase of the editing operation. During the action phase, the user determines which action, if any, to take relative to the items identified in the result list.

According to one embodiment, various controls are provided to assist the user to determine what action is appropriate for a given result set item. The controls will vary based on the nature of the signal that is being edited. In the context of editing an audio signal, for example, the user may be presented with a control for playing the portion of the audio signal that corresponds to a selected result list item. The playback operation may be designed to include a portion of the signal that immediately precedes the corresponding target area, and a portion of the signal that immediately follows the corresponding target area, so that the user can hear the target area in context.

In one embodiment, the controls include a Magnify button to facilitate a zoom operation. Activation of the Magnify button, illustrated in FIGS. 3 and 8, causes the visual depiction of the signal to "zoom in" on the portion of the signal that corresponds to a Result List item. In one embodiment, pressing down on the Magnify button zooms in on the corresponding target area, and releasing the Magnify button returns to the un-zoomed depiction of the signal. However, if a particular keyboard button is pressed when the Magnify button is selected, then the zoomed depiction of the signal continues to be displayed when the Magnified button is released. Because the length of target portions may vary, the degree of magnification used by the zoomed-in display generated by activating the Magnify button will also vary. Specifically, the zoomed-in display of a short target area will used a higher degree of magnification than the zoomed-in display of a longer target area.

In one embodiment, if a particular keyboard button is pressed when the Magnify button is selected, then the zoomed-in display includes only the portion of the signal that was identified as a possible defect. If that particular keyboard button is not selected, then the zoomed-in display includes a portion of the signal immediately preceding, and immediately following, the possible defect. According to one embodiment, this action of "zooming in" on the "problem area" may be activated in a variety of ways, such as clicking on the Result list entry associated with the problem. In one embodiment, clicking without pressing the option key selects the problem area and ½ second on either side of the problem area, and click-option selects just the problem area itself.

Another control that the signal editing application may provide to the user is a "defect only" button. Selection of the defect only button causes the signal editing application to display and/or play back a filtered version of the target area of a selected Result List item. Specifically, the target area is filtered so that all that remains is the portion of the signal that was identified as a defect. By filtering out the rest of the signal and listening to the alleged defect, the user may be able to better tell whether the alleged defect is in fact a defect.

For example, assume that the Result List interface contains an entry for a target area that, during the analysis phase, was identified as a "pop and click". The user may select the item from the Result List interface, and select the "defect only" button. In response, the signal editing application filters the target area and plays only the data that was considered to be a "click". Because the other content in the target area is filtered out, the playback of the "click" may be clear enough for the user to easily tell whether the click is in fact a defect. The defect only option allows the user to easily isolate false positives, such as when the "click" is actually a musician clicking her fingers, rather than a recording defect.

Consolidating the Display of Problems

According to one embodiment, when there are a large number of closely positioned problems, the signal editing application will coalesce the closely positioned problems into a single problem for display. As a result of the consolidation, it is easier for the end user to navigate through the problems, though internally the fixes are applied individually. An example of this can occur when an analog recording is captured and analyzed for clicks/pops. There may be dozens of pops per SECOND. Rather than display a separate results list entry for each of the dozen pops that occur within a given second of signal, a single entry may be displayed to represent all of them.

Editing Selected Target Areas

The tools described above assist the user in determining whether, for any given target area, an editing operation is needed. In addition to tools that assist the user in determining whether an editing operation is needed, the signal editing tool includes controls for automatically performing certain types of editing operations.

According to one embodiment, the signal editing application gives the user three options for each element in the Result List:

Ignore the item in the Result List

Manually alter the waveform using the complete set of waveform editor operations in the product.

Automatically process with suggested DSP for the item in the Result List.

In the embodiment illustrated in FIG. 3, a Fix button is provided. The action performed when the Fix button is activated depends on the nature of the selected Result List item. For example, if the selected Result List item is a "Click/Pop" item, then the signal editing application performs an operation for removing Click/Pops from the corresponding target area of the signal. On the other hand, if the selected Result List item is a "silence" item, then the signal editing application may add ambient noise to the corresponding target area of the signal.

If multiple items are selected in the Result List, then the target areas that correspond to all selected items are highlighted, and the fix button will apply to the all of the items. If the selected items are not the same type of items (e.g. some are "silence" and others "Click/Pop"), then the signal editing application will select the operation to perform on each corresponding target area based on the type of the selected item.

The embodiment illustrated in FIG. 3 also includes a "Fix All" button that causes the digital signal editing application to perform the "Automatically process with suggested DSP" for every element in the Result List. In the case of Fix All, all are target areas are fixed regardless of whether the user had selected the corresponding Result List entries.

According to one embodiment, a "preview fixed" control is also provided. In response to activation of the "preview fixed" control, a copy is made of the signal within the target area associated with the selected Result List item, and the appropriate DSP is applied to the copy. The "fixed" copy is then played so that the user can tell what effect application of the DSP will have on the target area. Because the changes are made to a copy of the signal, the target area remains unchanged if, based on the preview, the user decides not to make any changes.

As mentioned above, the action phase of the editing operation is interactive. Thus, a user may select a first set of elements, cause an editing operation to be performed on the first set, select a second set of elements, cause an editing operation to be performed on the second set, etc. Because the editing operations do not have to be performed on all of the target areas at the same time, the user may change the parameters used by the editing operations prior to each operation. For example, the automatic "fix" operation for pops/clicks may be based on input parameters that dictate how much information is removed during the "fix". The user may set the parameter to one setting to fix one of the pop/clicks listed in the Result List, and to a different setting to fix another of the pop/clicks listed in the Result List.

The Status Field

In the embodiment illustrated in FIG. 3, the Results List includes a status field. The value within the status field of each element indicates whether the target area that corresponds to the element has been "fixed". When the user presses the "fix" control, the appropriate automated editing operation is executed, and the status field is changed to indicate that the corresponding target area has been fixed.

In some cases, the Results List may be very long. To make the Results List easier to use, it is desirable to shorten it by removing entries that are no longer of interest to the user. Typically, a user will no longer be interested in entries that correspond to target areas that have already been fixed. Therefore, in one embodiment, the Results List interface includes a "Clear Fixed" button which, when selected, removes from the Results List all entries whose status has been changed to "fixed".

User Interface Controls

In the preceding description, numerous operations are described which are activated through user interaction with user interface controls. Specific types of user interface controls are illustrated in the accompanying drawings. However, the techniques described herein are not limited to any particular type or set of user interface controls. A close-up view of the portion of the signal depiction that corresponds to a selected Result List item may be obtained by: selecting a Magnify button, double-clicking the Result List item, right clicking the Result List item, selecting "Zoom" from a drop down or pop-up menu, etc.

Hardware Overview

Figure 11:
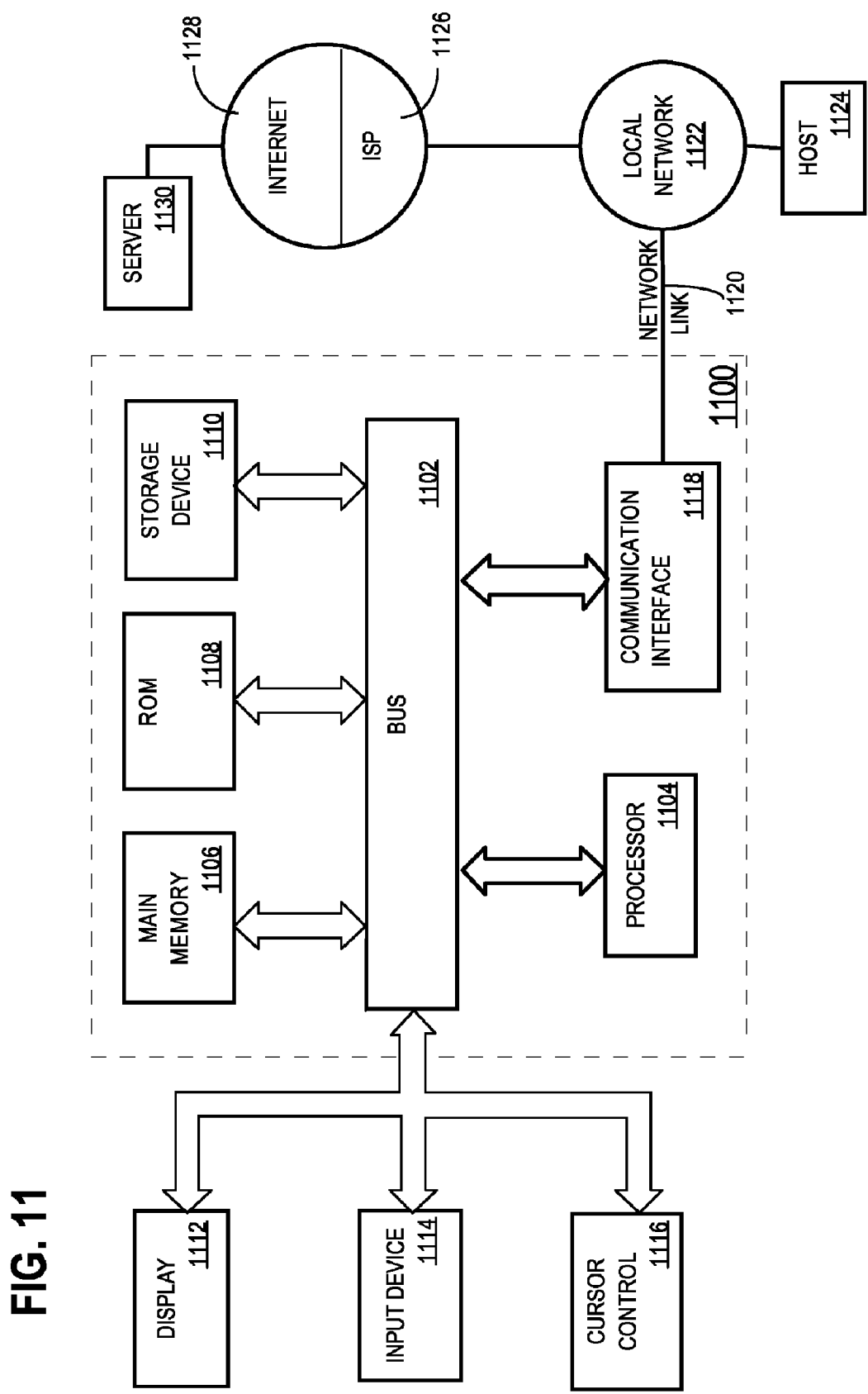
FIG. 11 is a block diagram of a computer system upon which embodiments of the invention may be implemented.

FIG. 11 is a block diagram that illustrates a computer system 1100 upon which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

The invention is related to the use of computer system 1100 for implementing the techniques described herein. According to one embodiment of the invention, those techniques are performed by computer system 1100 in response to processor 1104 executing one or more sequences of one or more instructions contained in main memory 1106. Such instructions may be read into main memory 1106 from another machine-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1100, various machine-readable media are involved, for example, in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution. In this manner, computer system 1100 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for editing signal data that represents a signal, the method comprising:
   analyzing digital signal data to identify a plurality of target areas that satisfy selection criteria;
   after analyzing the digital signal data and prior to modifying the digital signal data, displaying a user interface that includes a list of list entries;
   wherein each list entry in the list of list entries corresponds to a target area in the plurality of target areas;
   wherein, for each target area of the plurality of target areas, the list entry that corresponds to the target area indicates at least one of:
   (1) whether the target area has been modified, wherein one list entry in the list indicates that the corresponding target area has been modified and another list entry in the list indicates that the corresponding target area has not been modified, or (2) what type of problem has been identified for the target area, wherein one list entry in the list identifies a first type of problem and another list entry in the list identifies a second type of problem that is different than the first type of problem;

receiving first input that selects a subset of the list entries in the list;

after receiving the first input that selects the subset of the list entries in the list, receiving second input that specifies performance of an editing operation; and in response to receiving the second input that specifies performance of the editing operation, performing the editing operation on one or more target areas that correspond to the subset of the list entries in the list;

wherein the method is performed by one or more computing devices.

2. The method of claim 1 wherein:

the step of receiving first input that selects a subset of the list entries is performed by receiving first input that selects only one list entry; and the step of performing the editing operation on the target areas that correspond to the subset of the list entries is performed by performing the editing operation on the target area that corresponds to said one list entry.

3. The method of claim 2 wherein:

the step of analyzing the digital data includes running a plurality of analysis processes against the digital data, wherein each analysis process applies distinct selection criteria; and the editing operation performed on the target area that corresponds to said one list entry is automatically selected based on which analysis process selected the target area associated with said one list entry.

4. A non-transitory computer-readable medium storing instructions which, when executed by one or more processors, causes the performance of the method recited in claim 3.

5. A non-transitory computer-readable medium storing instructions which, when executed by one or more processors, causes the performance of the method recited in claim 2.

6. The method of claim 1 wherein the step of analyzing the digital data includes running a plurality of analysis processes against the digital signal data, wherein each analysis process applies distinct selection criteria.

7. A non-transitory computer-readable medium storing instructions which, when executed by one or more processors, causes the performance of the method recited in claim 6.

8. The method of claim 6 wherein:

the subset of list entries includes a first list entry that corresponds to a target area selected by a first analysis process;

the subset of list entries includes a second list entry that corresponds to a target area selected by a second analysis process that is different than the first analysis process; and the step of performing the editing operation on the target areas that correspond to the subset of the list entries includes performing a first type of editing operation on the target area selected by the first analysis process and performing a second type of editing operation on the target area selected by the second analysis process.

9. A non-transitory computer-readable medium storing instructions which, when executed by one or more processors, causes the performance of the method recited in claim 8.

10. The method of claim 1 wherein:

the step of receiving second input that specifies performance of an editing operation includes receiving input that specifies one or more parameter values to be used in said editing operation; and the step of performing the editing operation is performed based on said one or more parameter values.

11. A non-transitory computer-readable medium storing instructions which, when executed by one or more processors, causes the performance of the method recited in claim 10.

12. The method of claim 10 further comprising:

receiving third input that selects a second subset of the list entries in the list;

receiving fourth input that specifies performance of a second editing operation;

wherein the step of receiving fourth input that specifies performance of the second editing operation includes receiving input that specifies a second set of one or more parameter values to be used in said editing operation; and based on the second set of one or more parameter values, performing the second editing operation on the target areas that correspond to the second subset of the list entries.

13. A non-transitory computer-readable medium storing instructions which, when executed by one or more processors, causes the performance of the method recited in claim 12.

14. The method of claim 1 wherein:

the step of receiving first input that selects a subset of the list entries in the list is performed by receiving input that selects a plurality of selected list entries;

the step of analyzing the digital data includes running a plurality of analysis processes against the digital data, wherein each analysis process applies distinct selection criteria; and the editing operation performed on each of the target areas that correspond to said plurality of selected list entries is automatically selected based on which analysis process selected the target area associated with said list entry.

15. A non-transitory computer-readable medium storing instructions which, when executed by one or more processors, causes the performance of the method recited in claim 14.

16. The method of claim 1 further comprising the step of displaying a visual depiction of the signal in which the portions of the signal that correspond to the plurality of target areas are visibly distinguished from the portions of the signal that do not correspond to any target areas.

17. A non-transitory computer-readable medium storing instructions which, when executed by one or more processors, causes the performance of the method recited in claim 16.

18. The method of claim 1 further comprising, in response to certain input, displaying a visual depiction of the portion of the signal that corresponds to the target area associated with a selected list entry.

19. A non-transitory computer-readable medium storing instructions which, when executed by one or more processors, causes the performance of the method recited in claim 18.

20. The method of claim 1 further comprising, in response to certain input, performing the steps of:

making a copy of the portion of the signal data that corresponds to the target area associated with a selected list entry; and performing an editing operation on the copy to allow a user to preview the effect of the editing operation without modifying the original signal data.

21. A non-transitory computer-readable medium storing instructions which, when executed by one or more processors, causes the performance of the method recited in claim 20.

22. The method of claim 1 wherein the signal is an audio signal.

23. A non-transitory computer-readable medium storing instructions which, when executed by one or more processors, causes the performance of the method recited in claim 22.

24. The method of claim 22 wherein:
the list of list entries include a first list entry that corresponds to a first target area of the plurality of target areas and a second list entry that corresponds to a second target area of the plurality of target areas;
the first list entry indicates a first channel; and
the second list entry indicates a second channel that is different than the first channel.

25. A non-transitory computer-readable medium storing instructions which, when executed by one or more processors, causes the performance of the method recited in claim 24.

26. The method of claim 1 wherein:
the list entries include a list entry that corresponds to a particular target area; and
the list entry indicates a location, within the signal, at which the particular target area begins.

27. A non-transitory computer-readable medium storing instructions which, when executed by one or more processors, causes the performance of the method recited in claim 26.

28. The method of claim 1 wherein:
the list of list entries include a first list entry that corresponds to a first target area of the plurality of target areas and a second list entry that corresponds to a second target area of the plurality of target areas;
the first list entry indicates a first duration associated with the first target area; and
the second list entry indicates a second duration that is associated with the second target area and that is different than the first duration.

29. A non-transitory computer-readable medium storing instructions which, when executed by one or more processors, causes the performance of the method recited in claim 28.

30. The method of claim 1 wherein:
a particular target area is selected for inclusion in said plurality of target areas based on detection of a possible defect within the particular target area;
the method further comprises, in response to user input, generating a modified version of the particular target area, wherein content of said particular target area that does not correspond to said possible defect has been filtered out of the modified version.

31. A non-transitory computer-readable medium storing instructions which, when executed by one or more processors, causes the performance of the method recited in claim 30.

32. The method of claim 30 wherein:
the signal is an audio signal; and
the method includes the step of playing the modified version of the particular target area.

33. A non-transitory computer-readable medium storing instructions which, when executed by one or more processors, causes the performance of the method recited in claim 32.

34. A non-transitory computer-readable medium storing instructions which, when executed by one or more processors, causes the performance of the method recited in claim 1.

35. The method of claim 1 wherein:
the list entries include a first list entry that corresponds to a first target area and a second list entry that corresponds to a second target area;
the first list entry indicates that the first target area has been modified; and
the second list entry indicates that the second target area has not been modified.

36. The method of claim 35 wherein:
the user interface includes a control which, when selected, removes from the results list all list entries that have a particular value in the status field.

37. A non-transitory computer-readable medium storing instructions which, when executed by one or more processors, causes the performance of the method recited in claim 36.

38. The method of claim 1, wherein:
the list includes a first list entry, a second list entry, and a third list entry;
the second list entry is between the first list entry and the third list entry in the list; and
the subset includes the first list entry and the third list entry and not the second list entry.

39. A non-transitory computer-readable medium storing instructions which, when executed by one or more processors, causes the performance of the method recited in claim 38.

40. The method of claim 1, wherein one of the list entries represents multiple target areas of the plurality of target areas and none of the target areas of the multiple target areas is represented by another list entry of the list entries.

41. A non-transitory computer-readable medium storing instructions which, when executed by one or more processors, causes the performance of the method recited in claim 40.

42. The method of claim 1, wherein, for each target area of the plurality of target areas, the list entry that corresponds to the target area indicates what type of problem has been identified for the target area, wherein one list entry in the list identifies a first type of problem and another list entry in the list identifies a second type of problem that is different than the first type of problem.

43. A non-transitory computer-readable medium storing when executed by one or more processors, causes the performance of the method recited in claim 42.

44. A method for editing signal data that represents a signal, the method comprising:
running a plurality of analysis processes against the signal data to identify a plurality of target areas that satisfy selection criteria, wherein each analysis process applies distinct selection criteria;
receiving first input that selects a first subset of the plurality of target areas, wherein the first subset of the plurality of target areas correspond to a first type of problem;
receiving second input that selects a second subset of the plurality of target areas that is different than the first subset, wherein the second subset of the plurality of target areas correspond to a second type of problem that is different than the first type of problem; and in response to a single activation of a single graphical element of a user interface, performing a first type of editing operation on the first subset of the plurality of target areas and performing, on the second subset of the plurality of target areas, a second type of editing operation that is different than the first type of editing operation;

wherein the method is performed by one or more computing devices.

45. A non-transitory computer-readable medium storing instructions which, when executed by one or more processors, causes the performance of the method recited in claim 44.

46. A method for editing signal data that represents a signal, the method comprising:

analyzing digital signal data to identify a plurality of not-yet corrected target areas that satisfy selection criteria;

after analyzing the digital signal data and prior to modifying the digital signal data, displaying a user interface that includes a list of list entries, wherein each list entry in the list corresponds to a not-yet corrected target area in the plurality of not-yet corrected target areas;

wherein the list of list entries includes a particular list entry that is preceded by one or more first list entries in the list and is succeeded by one or more second list entries in the list;

wherein the particular list entry corresponds to a particular not-yet corrected target area of the plurality of not-yet corrected target areas;

wherein each list entry of the one or more first list entries corresponds to a not-yet corrected target area of the plurality of not-yet corrected target areas;

wherein each list entry of the one or more second list entries corresponds to a not-yet corrected target area of the plurality of not-yet corrected target areas;

wherein displaying the user interface comprises, prior to modifying the particular not-yet corrected target area, displaying the one or more first list entries, the particular list entry, and the one or more second list entries to allow a user to decide whether to correct the particular not-yet corrected target area based on knowledge about one or more not-yet corrected target areas that occurred before the particular not-yet corrected target area in the digital signal data and one or more not-yet corrected target areas that occurred after the particular not-yet corrected target area in the digital signal data;

receiving first input that selects the particular list entry;

after receiving the first input that selects the particular list entry, receiving second input that specifies performance of an editing operation; and in response to receiving the second input that specifies performance of the editing operation, performing the editing operation on the not-yet corrected target area that corresponds to the particular list entry;

wherein the method is performed by one or more computing devices.

47. A non-transitory computer-readable medium storing instructions which, when executed by one or more processors, causes the performance of the method recited in claim 46.

* * * * *